United States Patent
Nagendran et al.

(10) Patent No.: US 12,216,810 B2
(45) Date of Patent: Feb. 4, 2025

(54) SYSTEMS AND METHODS FOR AUTOMATED CONTROL OF HUMAN INHABITED CHARACTERS

(71) Applicant: Mursion, Inc., San Francisco, CA (US)

(72) Inventors: Arjun Nagendran, San Mateo, CA (US); Brian D. Kelly, Orlando, FL (US)

(73) Assignee: Mursion, Inc., San Francisco, CA (US)

( * ) Notice: Subject to any disclaimer, the term of this patent is extended or adjusted under 35 U.S.C. 154(b) by 0 days.

(21) Appl. No.: 16/801,843

(22) Filed: Feb. 26, 2020

(65) Prior Publication Data
US 2021/0263582 A1   Aug. 26, 2021

(51) Int. Cl.
| | |
|---|---|
| G06F 3/01 | (2006.01) |
| G06F 3/04847 | (2022.01) |
| G06F 3/0487 | (2013.01) |
| G06T 13/40 | (2011.01) |
| G10L 15/18 | (2013.01) |
| G10L 15/22 | (2006.01) |
| G10L 25/63 | (2013.01) |
| G10L 15/08 | (2006.01) |

(52) U.S. Cl.
CPC .......... *G06F 3/011* (2013.01); *G06F 3/04847* (2013.01); *G06F 3/0487* (2013.01); *G06T 13/40* (2013.01); *G10L 15/1815* (2013.01); *G10L 15/22* (2013.01); *G10L 25/63* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 6,404,438 B1 * | 6/2002 | Hatlelid | .................. | G06F 3/033 |
| | | | | 434/350 |
| 10,732,708 B1 * | 8/2020 | Roche | ...................... | G10L 15/22 |
| 2011/0296324 A1 * | 12/2011 | Goossens | ............... | G06Q 50/01 |
| | | | | 715/763 |

(Continued)

FOREIGN PATENT DOCUMENTS

| | | | | |
|---|---|---|---|---|
| WO | WO-2016014597 A2 * | 1/2016 | ............. | H04L 29/06 |
| WO | WO 2016/201030 A1 | 12/2016 | | |

OTHER PUBLICATIONS

Communication dated Mar. 14, 2023, from the European Patent Office in European Application No. 21158734.0.

*Primary Examiner* — Benjamin X Casarez
(74) *Attorney, Agent, or Firm* — Van Pelt, Yi & James LLP

(57) ABSTRACT

Systems and methods for automated control of human inhabited characters. In an example, control of human inhabited character may be achieved via a plurality of input devices, including, but not limited to, a microphone, a camera, or a hand-held controller, that can modify and trigger changes in the appearance and/or the behavioral response of a character during the live interactions with humans. In an example, a computing device may include a neural network that receives the input from the microphone and/or the camera and changes the appearance and/or the behavioral response of the character according to the input. Further, input from the hand-held controller may be used to adjust a mood of the character or, in other words, emphasize or deemphasize the changes to the appearance and/or the behavioral response of the character.

23 Claims, 9 Drawing Sheets

(56) References Cited

U.S. PATENT DOCUMENTS

| | | | |
|---|---|---|---|
| 2012/0148161 A1* | 6/2012 | Kim | G06T 13/40 |
| | | | 382/195 |
| 2014/0002464 A1* | 1/2014 | Furukawa | G10L 21/10 |
| | | | 345/474 |
| 2018/0165863 A1 | 6/2018 | Kubo et al. | |
| 2018/0185753 A1* | 7/2018 | Nakagawa | G06F 3/011 |
| 2019/0204907 A1* | 7/2019 | Xie | A63F 13/424 |
| 2019/0325633 A1* | 10/2019 | Miller, IV | G06V 40/18 |
| 2019/0354181 A1* | 11/2019 | Woo | G06F 3/011 |
| 2020/0081535 A1* | 3/2020 | Woo | G06F 3/011 |
| 2020/0082590 A1* | 3/2020 | Woo | G06F 3/015 |
| 2020/0090394 A1* | 3/2020 | Hong | G06F 3/0346 |
| 2020/0139077 A1* | 5/2020 | Biradar | G06K 9/00302 |
| 2020/0175739 A1* | 6/2020 | Meister | H04M 1/72544 |
| 2020/0258280 A1* | 8/2020 | Park | G06T 13/40 |

* cited by examiner

SYSTEMS AND METHODS FOR AUTOMATED CONTROL OF HUMAN INHABITED CHARACTERS

BACKGROUND

The present disclosure relates to computing systems, and more particularly, to systems and methods for automated control of human inhabited characters, such as avatars, animations, puppets, robots, or holograms, among other types of images/embodiments.

The animation of characters is provided by computing systems in a variety of industries, such as the film industry, advertising, computing gaming, and education, among others. Character control is typically performed via an input controller (e.g., hand-held controller or mouse) in which a user inputs commands (e.g., depresses one or more buttons) to control an appearance/movement of the character. In the case of a human inhabited character, in which a user provides a voice and actions for the character in real time, the user is required to learn a number of input commands (e.g., a number of button combinations) to control behaviors of the character that mimic desired behaviors corresponding to a conversation or other interaction between the character and an end user. However, a significant amount of time and/or effort may be required to learn these input commands.

Accordingly, there is a need in the art for improvements to the control of human inhabited characters.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method for automated control of human inhabited characters is provided. The method may include receiving, from a first input device, first data of one or more users. The method may also include receiving, from a second input device, second data corresponding to the one or more users, wherein the first data corresponds to the audio data or the second data corresponds to image data. The method may also include determining an appearance state for the human inhabited character based on the first and second data. The method may also include displaying, on a display, the human inhabited character based on the appearance state.

In another aspect, a computing device is provided. The computing device may include a display, a memory storing instructions, and a processor communicatively coupled with the display and the memory. The processor may be configured to receive, from a first input device, first data of one or more users. The processor may also be configured to receive, from a second input device, second data corresponding to the one or more users, wherein the first data corresponds to the audio data or the second data corresponds to image data. The processor may also be configured to determine an appearance state for the human inhabited character based on the first and second data. The processor may also be configured to display, on the display, the human inhabited character based on the appearance state.

In another aspect, a computer-readable medium storing executable code for a processor is provided. The computer-readable medium may include code for receiving, from a first input device, first data of one or more users. The computer-readable medium may also include code for receiving, from a second input device, second data corresponding to the one or more users, wherein the first data corresponds to the audio data or the second data corresponds to image data. The computer-readable medium may also include code for determining an appearance state for the human inhabited character based on the first and second data. The computer-readable medium may also include code for displaying, on a display, the human inhabited character based on the appearance state.

In another aspect, an apparatus for automated control of human inhabited characters is provided. The apparatus may include means for receiving, from a first input device, first data of one or more users. The apparatus may also include means for receiving, from a second input device, second data corresponding to the one or more users, wherein the first data corresponds to the audio data or the second data corresponds to image data. The apparatus may also include means for determining an appearance state for the human inhabited character based on the first and second data. The apparatus may also include means for displaying, on a display, the human inhabited character based on the appearance state.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
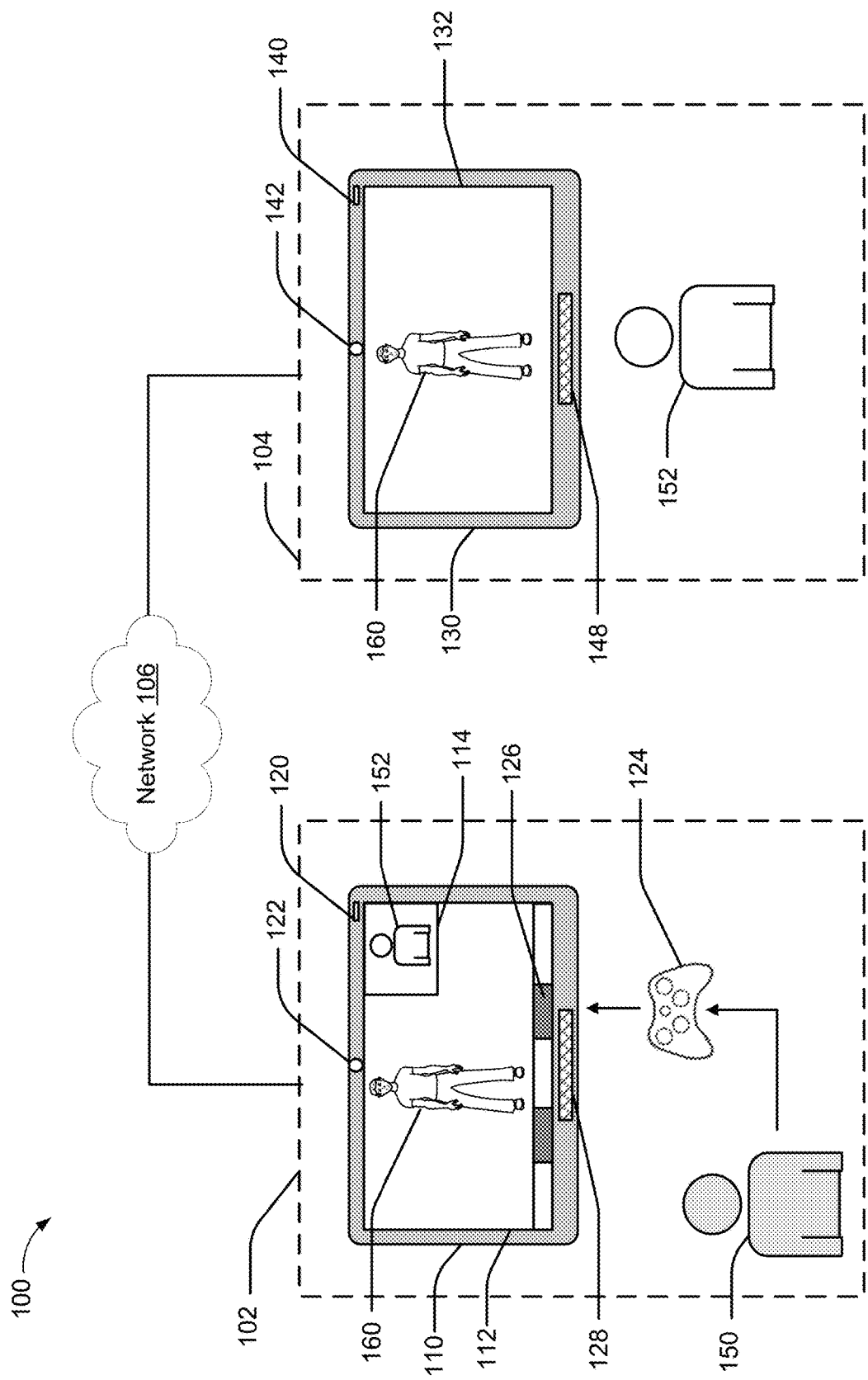
FIG. 1 is a conceptual diagram of an example system for automated control of a human inhabited character, according to aspects of the present disclosure.

The present disclosure provides systems and methods for automated control of human inhabited characters. In an example, human inhabited characters include, for example, avatars, animations, puppets, robots, or holograms, among other types of images/embodiments used for real time (or live) interaction with another human. In such live interactions, the character may be controlled or embodied by a human user, sometimes called a human specialist (interchangeably referred to herein as a specialist, simulation specialist, inhabitor, or interactor). A human inhabited character is suited for emotionally complex and sensitive human interactions that cannot be replicated in a scripted artificial intelligence (AI)-driven system. Inclusion of a human in the virtual environment to control the character in real time allows another human, such as a trainee (interchangeably referred to herein as learner, end user, or person to be counseled), to experience a wider range of human emotions and non-verbal cues in an individualized experience not limited by scripted responses. The inhabited character may respond like a real human being in real time.

Typically, a specialist controls an appearance, such as facial expressions or movements, of a character via an input controller (e.g., hand-held controller or mouse), while the specialist is speaking to a trainee. Use of the input controller may require extensive training and practice by the specialist to learn which buttons and/or combination of buttons correlate to different appearances/movements/moods of the character.

According to aspects of the present disclosure, control of a character may be achieved via a plurality of input devices including, but not limited to, a microphone, a camera, or a hand-held controller, that can modify and/or trigger changes in the appearance and/or the behavioral response of a character during the live interactions with humans. In an example, a computing device may include a neural network that receives an input from a microphone and/or a camera and changes the appearance and/or the behavioral response of the character according to the input. Further, input from the hand-held controller may be used to adjust a mood of the character or to emphasize or deemphasize the changes to the appearance and/or the behavioral response of the character, as described in more detail herein.

Automated control of human inhabited characters via a plurality of input devices, as described herein, may reduce an amount of training for a trainee as less input commands via an input controller may be required. Further, aspects described herein may allow a specialist to focus on a conversation between the specialist and a trainee and not on a combination of buttons required to change an appearance/behavior of the character. Use of a mood controller, as described herein, may also provide a feedback process (or rating process) to a trainee in real time.

Turning now to the figures, examples of systems and methods for automated control of human inhabited characters on a computing system are depicted. It is to be understood that aspects of the figures may not be drawn to scale and are instead drawn for illustrative purposes.

Referring to FIG. 1, an example system 100 includes a specialist node 102 communicatively coupled to a trainee node 104 via a network 106. Examples of the network 106 includes one or more of a local area network, wide area network, or the Internet.

The specialist node 102 includes a computing device 110 configured to control an appearance (e.g., facial expression or pose) and/or a behavioral response of an animated character 160 (interchangeably referred to herein as human inhabited character, avatar, animation, puppet, robot, or hologram, among other images/embodiments). In an example, the computing device 110 displays the animated character 160 on a display 112, and one or more input devices receive input from a human specialist 150 to control the character 160. The input devices may include, but are not limited to, a microphone 120, a camera 122, and an input controller 124 (e.g., hand-held controller, mouse, touchscreen). In an example, the microphone 120 is configured to capture audio of the human specialist 150, and the camera 122 is configured to capture images (or video) of the human specialist 150. The computing device 110 may modify the appearance and/or the behavioral response of the animated character 160 to correspond to the captured audio and/or images, as explained in further detail herein. Further, the input controller 124 may also modify the appearance and/or the behavioral response of the character 160 in response to input from the human specialist 150 based on interactions by the human specialist 150 with physical buttons on the input controller 124 and/or virtual controls 126 (e.g., buttons, menus, icons, links) on the display 112.

In an example, the display 112 also includes a window/screen 114 to display a trainee 152 (e.g., learner, end user or person to be counseled) based on images received from the trainee node 104 in real-time. In an example, the computing device 110 includes a speaker 128 to output audio of the trainee 152 in real-time.

While the display 112, the microphone 120, the camera 122, the speaker 128, and the window/screen 114 are illustrated as combined components of the computing device 110, aspects of the present disclosure are not limited to this implementation. In other examples, one or more of the display 112, the microphone 120, the camera 122, the speaker 128, or the window/screen 114 may be detached components communicatively coupled to the computing device 110.

The trainee node 104 includes a computing device 130 configured to display, via display 132, the animated character 160 controlled by the human specialist 150. The computing device 130 may include a microphone 140 configured to capture audio of the trainee 152 and a camera 142 configured to capture images of the trainee 152. The computing device 130 is further configured to transmit the audio and/or the images of the trainee 152 to the computing device 110 (or human specialist node 102) for real-time interaction between the human specialist 150 (via animated character 160) and the trainee 152.

In an example, audio and images from the computing device 130 may also be used to control an appearance or behavior of the animated character 160, as described herein.

While the display 132, the microphone 140, the camera 142, and the speaker 148, are illustrated as combined components of the computing device 130, aspects of the present disclosure are not limited to this implementation. In other examples, one or more of the display 132, the microphone 140, the camera 142, and the speaker 148 may be detached components communicatively coupled to the computing device 130.

While examples herein describe a single animated character 160 and a single trainee 152, application of aspects of the present disclosure are not limited to these aspects. Instead, implementation of aspects and examples of the present application may allow the human specialist 150 or a plurality of human specialist (including human specialist 150) to control a plurality of animated characters (including animated character 160), and/or a plurality of trainees (including trainee 152) to communicate with one or more human specialist. As an example, one or more human specialist may control a plurality of animated characters to represent a panel of people during, for example, a job interview, a court hearing, a social event, or any other process representing a plurality of people. In an example, one or more trainees may communicate with one or more animated characters via a single trainee node 104 or a plurality of trainee nodes.

Figure 2:
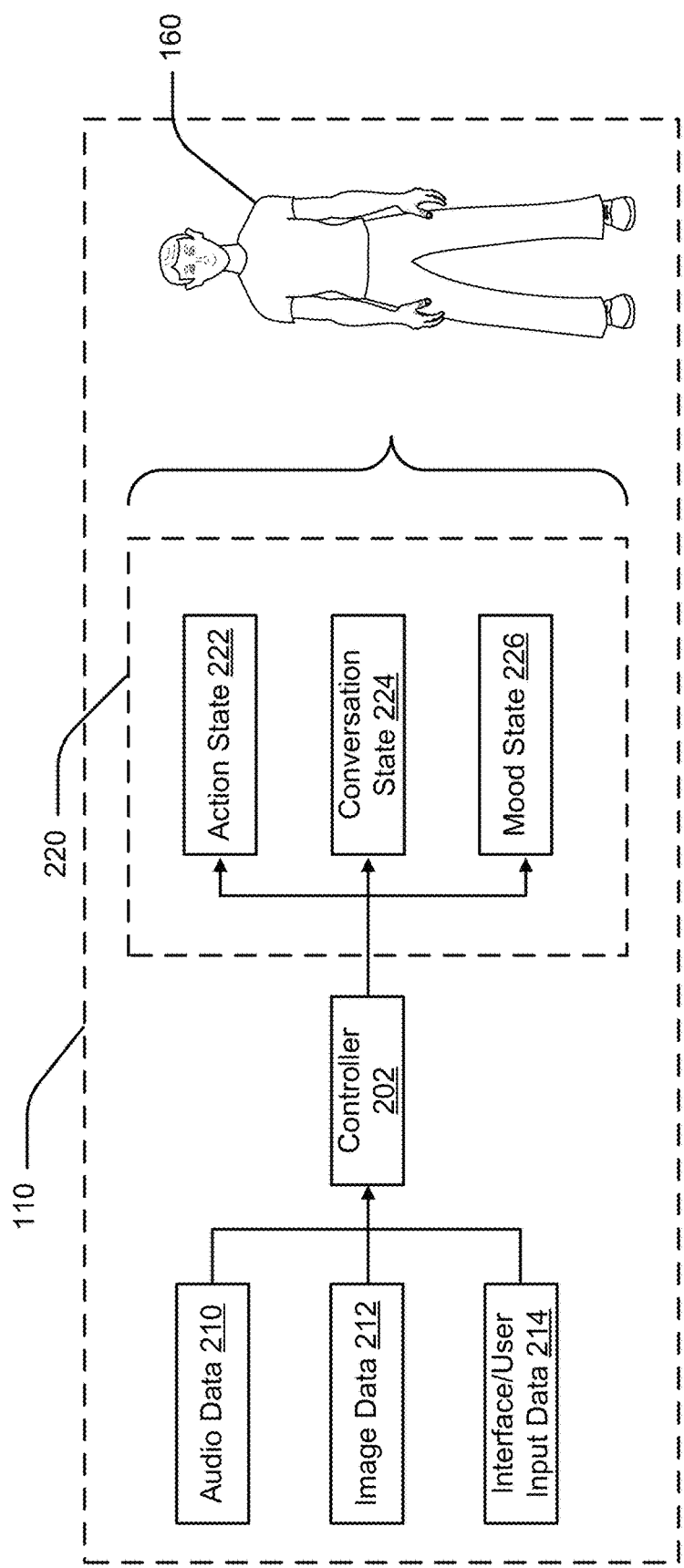
FIG. 2 is a conceptual diagram of an example computing device of FIG. 1 for generating appearance states for an animated character, according to aspects of the present disclosure.

Referring to FIG. 2, a conceptual view of the computing device 110 determining appearance states of the animated character 160 is disclosed. In an example, a controller 202 of the computing device 110 receives audio data 210, image data 212, and/or user input data 214 from the human specialist 150. The controller 202 may include artificial intelligence (AI) or a neural network trained to correlate audio data, image data, and user input data with appearance states 220 of the animated character 160. The appearance states 220 may include, for example, an action state 222, a conversation state 224, and a mood state 226. While described separately, each of the appearance states 220 may affect each other.

The action state 222 may correlate to an appearance of the animated character 160 performing an action (e.g., moving, picking up object, steering a car). In an example, an action may be controlled by the interface/user input data 214. For example, the interface/user input data 214 may correspond to the human specialist 150 left clicking a mouse to select an action and left clicking again to apply the action to the animated character 160. In other words, the controller 202 may allow the interface/user input data 214 to determine the actions but the controller 202 processes input data to determine transitions between the actions thereby causing the animated character 160 to appear to perform natural transitions between actions.

The conversation state 224 may correlate to an appearance of the animated character 160 during a conversation with the trainee 152. Referring FIG. 3, an example state diagram for the conversation state 224 is depicted. The conversation state 224 may transition between a limbo state 310, a passive listening state 312, an active listening state 314, and a speaking state 316 based on the audio data 210, the image data 212, and the user input data 214. For example, the conversation state 224 may change based on the human specialist 150 talking, head motion of the human specialist 150, and/or words of the conversation, among other states.

Figure 3:
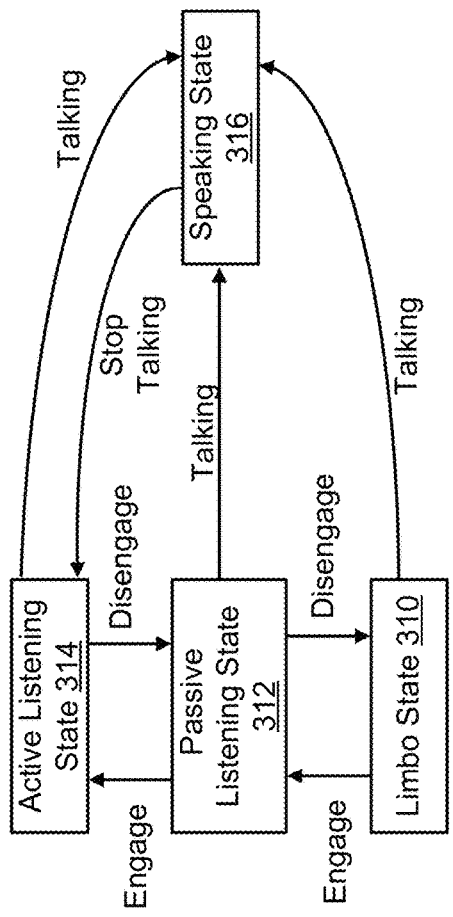
FIG. 3 is a state diagram of example conversation states generated by the computing device of FIG. 1 for an animated character, according to aspects of the present disclosure.

As illustrated by FIG. 3, the conversation state 224 may transition to the speaking state 316 from any of the other states when the human specialist 150 (via the animated character 160) talks to the trainee 152. In the speaking state 316, the animated character 160 may appear to speak according to speech from the audio data 210 and also look at the trainee 152 according to how the human specialist 150 is looking at the trainee 152. In other words, in the speaking state 316, the controller 202 may provide more control of how the animated character 160 is looking at the trainee 152 based on how the human specialist is looking at the trainee 152, as compared to other states. In an example, if there are a plurality of trainees, in the speaking state 316, the animated character 160 may perform actions (e.g., eye or head movements) to look at one or more trainees. In an example, the controller 202 may transition the conversation state 224 from the speaking state 316 to the active listening state 314 in response to the human specialist 150 finishing talking.

In the active listening state 314, the animated character 160 may be listening to the trainee 152 and will likely talk to the trainee 152. In this state, the controller 202 may control the animated character 160 to, for example, have minimal posture changes, typically look towards the trainee 152, and provide minimal gestures (e.g., hand, arm, or facial movements).

In the passive listening state 312, the animated character 160 may be listening to the trainee 152 but not participating in a conversation with the trainee 152. In this state, the controller 202 may control the animated character 160 to, for example, have some posture changes, typically look towards the trainee 152, and provide minimal gestures.

In the limbo state 310, the animated character 160 may not be paying attention, or paying a minimal amount of attention, to the trainee 152. In the limbo state 310, the controller 202 may control the animated character 160 to, for example, have conversational interrupts and posture changes.

In an example, the controller 202 may sequentially transition the conversation state 224 between the limbo state 310, the passive listening state 312, and the active listening state 314 based on the how engaged or disengaged the human specialist 150 is in the conversation.

Figure 4:
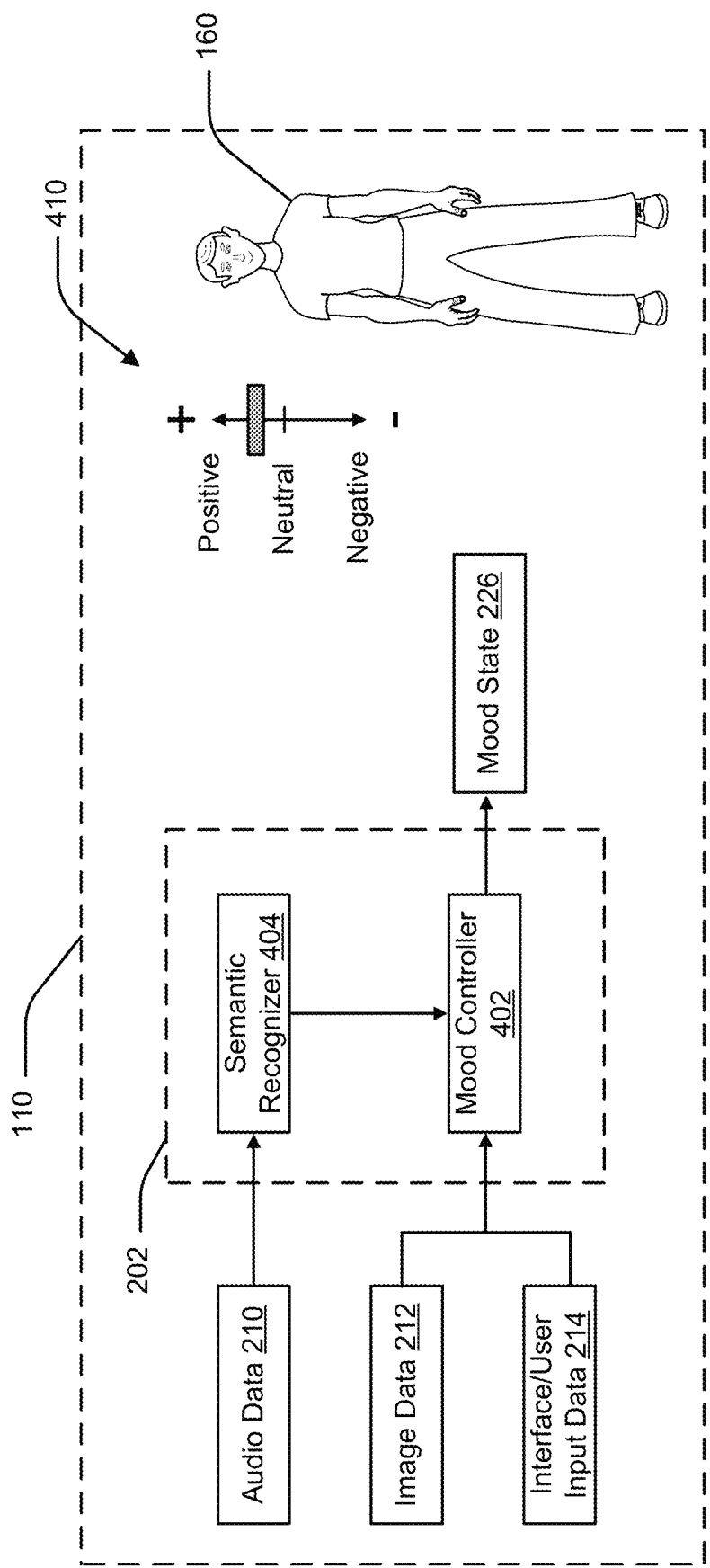
FIG. 4 is a conceptual diagram of the computing device of FIG. 1 for generating mood states for an animated character, according to aspects of the present disclosure.

The mood state 226 may control the mood of the animated character 160 thereby affecting, for example, facial expressions and actions of the animated character 160. Referring to FIG. 4, a conceptual view of the computing device 110 determining mood states of the animated character 160 is disclosed. In an example, a graphical representation, such as sliding bar 410, of the mood state 226 may be used. As illustrated, the mood state 226 may range between positive, neutral, and negative based on one or more inputs. The controller 202 may include a mood controller 402 configured to control the mood state 226 of the animated character 160. In an aspect, the mood controller 402 may be a neural network trained to determine a mood based on the audio data 210, the image data 212, and/or the user input data 214. In an example, the mood controller 402 may categorize body languages and facial expressions based on the mood state 226. However, in some examples, such as before the start of a conversation between the animated character 160 and the trainee 152, the mood controller 402 may implement the mood state 226 via a stochastic process. Further, the mood controller 402 may infer the mood state 226 based on one or more of the audio data 210 and the image data 212 associated with the human specialist 150 and the trainee 152. In some examples, the mood state 226 may use input data 214 from the human specialist 150 to determine the mood state 226. For example, the user input data 214 may indicate a location for the sliding bar 410 so the animated character 160 better portrays facial expressions or emotions according to the conversation. In this example, the user input data 214 may allow the human specialist 150 to portray less facial expression or emotion during the conversation. In other words, the human specialist 150 may focus more on the conversation on not on facial expressions or emotions captured by the image data 212.

In an aspect, the controller 202 may also include a semantic recognizer 404 configured to receive the audio data 210 and detect words or phrases that may indicate a mood or transition in mood of the conversation between the animated character 160 and the trainee 152. For example, positive words or phrases such as "great" or "nice job" may affect the mood state 226 to transition towards (or remain) being positive, while negative words or phrases, such as "dejected" or "that is not good" may affect the mood state 226 to transition towards (or remain) being negative. In an example, the semantic recognizer 404 may indicate to the mood controller 402 the detected words or phrases and/or a mood associated with the detected words or phrases.

Figure 5:
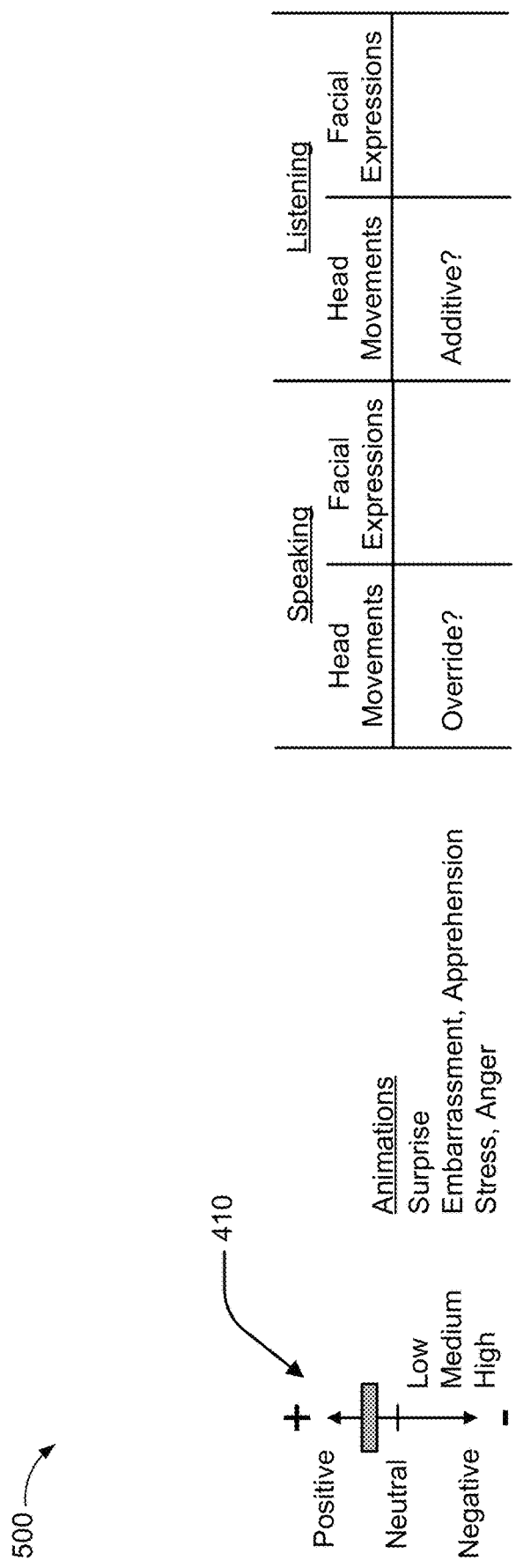
FIG. 5 is a conceptual diagram of a mood state of an animated character, according to aspects of the present disclosure.

Referring to FIG. 5, an example representation 500 of the sliding bar 410 being used for a mood state 226 is disclosed. In an aspect, the different levels of the mood state 226 may correspond to the different appearance states 220 (or animations). For example, as the level of the mood state 226 decreases (i.e., goes from a low negative mood to a high negative mood) the appearance state 220 may change from surprise to embarrassment/apprehension to stress/anger. Accordingly, the conversation state 224 may change to reflect the these changes as well.

In an aspect, while in the positive zone (between neutral and positive), the mood controller 402 may generate a mood state 226 having micro gestures (e.g., small movements), conversational gestures, but facial/head motions are mostly overridden to comply with real-time movements corresponding to the human specialist 150. In another aspect, while in the negative zone (between neutral and negative), the mood controller 402 may generate a mood state 226 having micro gestures (e.g., small movements), conversational gestures, but facial/head motions are mostly additive so that the controller 202 has more control over the animations. Further, in the negative zone, the animations may have many variations. At all times, the mood controller 402 may allow idle animations, posture changes, transitional animations between different states (e.g., speaking state and listening state), and may include distraction animations.

Figure 6:
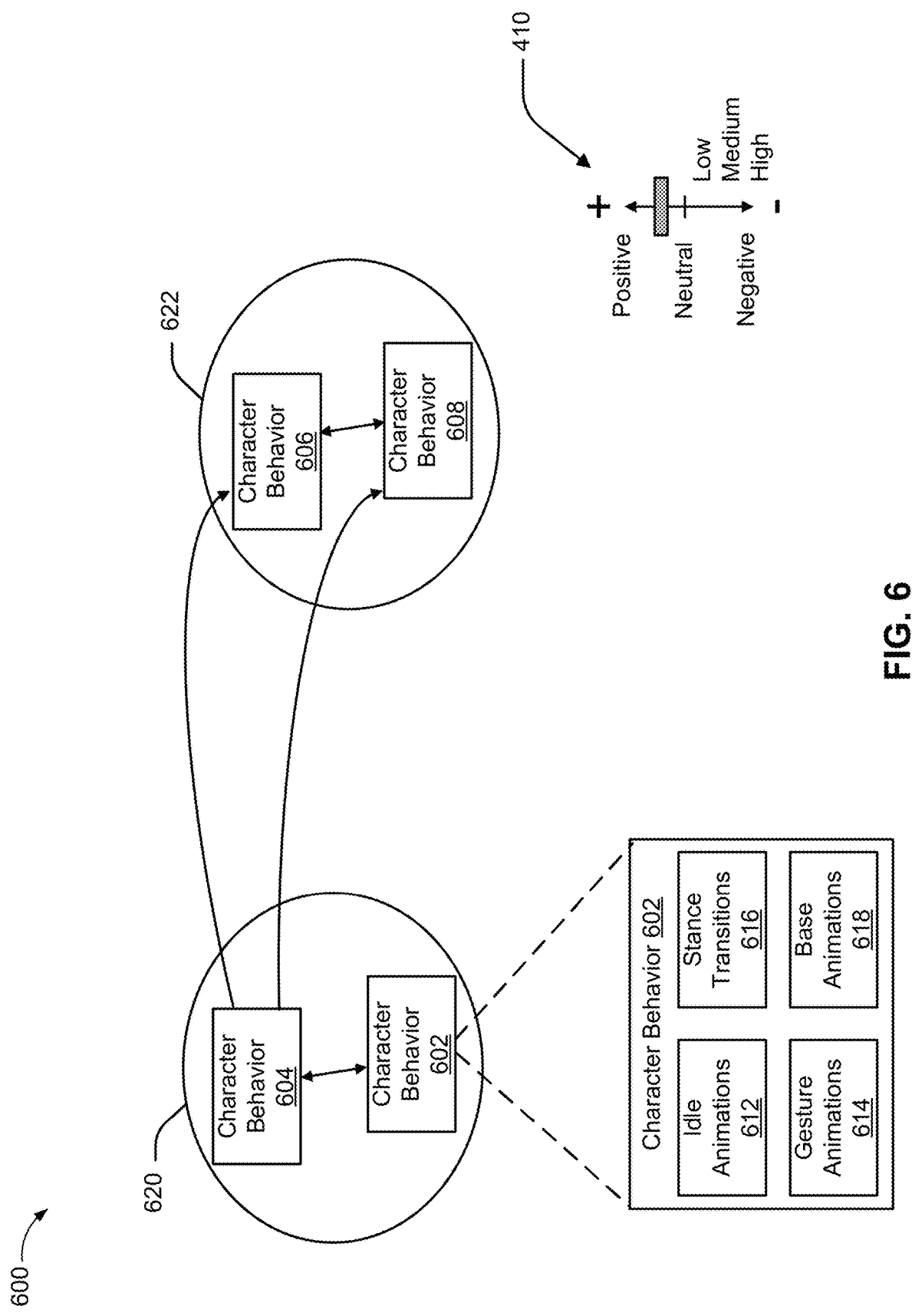
FIG. 6 is a state diagram of example character behaviors of an animated character and transitioning between the character behaviors, according to aspects of the present disclosure.

Referring to FIG. 6, a conceptual view of an example flowchart 600 illustrating character behaviors is disclosed. Character behaviors may include data structures (e.g., stored code) used by the controller 202 to modify an appearance state 220 of the animated character 160. In an example, the animated character 160 may contain a plurality of character behaviors 602-608. Each of the character behaviors 602-608 may include a plurality of animations associated with the corresponding character behavior. For example, the character behavior 602 includes idle animations 612 which relate to a plurality facial expressions, positions, movements, etc. of the animated character 160 being in a idle state. The character behavior 602 may also include gesture animations 614 (e.g., hand fiddling, arms or legs crossing) which relate to a plurality facial expressions, positions, movements, etc., which correspond to the character behavior 602 and may be performed by the animated character 160 while in any state, other than an idle state. The character behavior 602 may also include stance transitions 616 which include instructions for transitioning the animated character 160 between character behaviors. The character behavior 602 may also include base animations 618 which relate to a plurality facial expressions, positions, movements, etc. which correspond to character behavior 602. The base animations 618 may establish the animated character's 160 overall posture for the character behavior 602. In an example, the idle animations 612 and the gesture animations 614 are additively combined with the base animations 618 to create the final effect. In an example, the base animations 618 may be optional.

In an aspect, the controller 202 may group character behaviors based on similarity in animations between the character behaviors. As illustrated by FIG. 6, a first group 620 may contain the character behaviors 602 and 604, and a second group 622 may contain the character behaviors 606 and 608, based on similarities between animations. In an example, character behaviors 602 and 604 in the first group 620 may relate to animations of the animated character 160 while sitting, and character behaviors 606 and 608 in the second group 622 may relate to animations of the animated character 160 while standing. Character behaviors in the same group may allow the controller 202 to easily transition between the character behaviors (e.g., character behaviors 602 and 604) due to the similarities in the animations. For example, the character behavior 602 may relate to the animated character 160 sitting and facing forward, and the character behavior 604 may relate to the animated character 160 sitting and facing in a left direction. Accordingly, the controller 202 may transition between these character behaviors merely based on the data structures of the gesture animations 614. However, when a transition is needed from a character behavior of the first group 620 to a character behavior of the second group 622, the controller 202 may also rely on the stance transitions 616 to provide animations between these character behaviors. For example, the stance transitions 616 may provide instructions for the animated character 160 to transition from a sitting position to a standing position in a smooth motion.

In an aspect, the mood state 226 may affect transitions between the different character behaviors. For example, when the mood state 226 is in a more positive mood, as represented by the sliding bar 410, the controller 202 may allow for slower transitions between character behaviors in different groups to simulate a more stable animated character 160 associated with a positive mood. In the alternative, when the mood state 226 is in a negative mood, the controller 202 may allow for quicker transitions between character behaviors in different groups to simulate a more unstable animated character 160 associated with a negative mood.

In some aspects, the controller 202 may be able to "override" the animated character 160 from looking at and providing eye contact with the trainee 152. The controller 202 may allow the animated character 160 to speak to a group of trainees by looking at every trainee in the group (including other animated characters or trainees) or focusing primarily on a single animated character or trainee of the group. The controller 202 may also allow the animated character 160 to look away from the speaker briefly (e.g., in thinking state, or to look at another animated character to see his/her reaction).

In the case of multiple speakers, the controller 202 may cause the animated character 160 to make frequent eye contact based on the mood state 226 of the animated character 160. In another example, in the limbo state 310, the animated character 160 may automatically talk (via pre-recorded message). In this case, the animated character 160 may not transition to the speaking state 316 as the animated character 160 is not participating in a main conversation.

In some aspects, the human specialist 150 and the trainee 152 may talk at the same time. In the case of additional animated characters that are listening, a focus of these animated characters may depend on one or more of a proximity, a loudness, or a talking duration of the speaking animated character 160 or the trainee 152. In an example, if the human specialist 150 and the trainee 152 try to talk over each other for a while, this may indicate to the controller 202 that the conversation is tense and the listening characters may look at both of the animated character 160 and the trainee 152.

Figure 7:
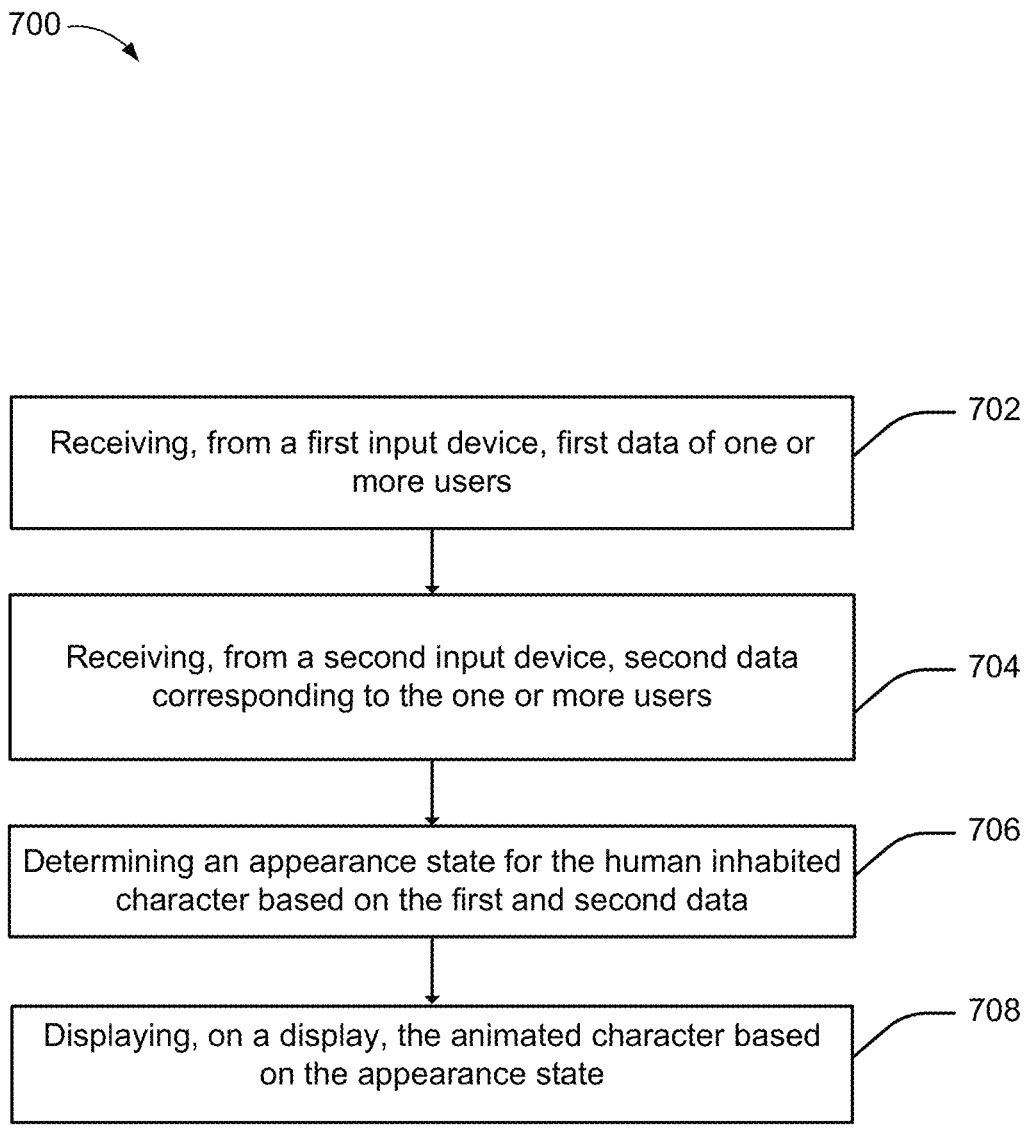
FIG. 7 is a flowchart of an example method for automated control of human inhabited characters by the computing device of FIG. 1, according to aspects of the present disclosure.

Referring to FIG. 7, an example method 700 for automated control of human inhabited characters is depicted. In an example, the method 700 may be performed by the computing device 110 of FIGS. 1 and 8. Examples of some of the operations of the method 700 may be described in relation to FIGS. 1-6.

At 702, the method 700 may include receiving, from a first input device, first data of one or more users. For example, one or more of the computing device 110, a processor 802, a communications component 806, or the controller 202 may receive, from the microphone 120 and/or 140, the audio data 210 of one or more of the human specialist 150 and/or the trainee 152.

At 704, the method 700 may also include receiving, from a second input device, second data corresponding to the one or more users. For example, one or more of the computing device 110, the processor 802, the communications component 806, or the controller 202 may receive, from the camera 122 and/or 142, the image data 214 of one or more of the human specialist 150 and/or the trainee 152.

At 706, the method 700 may also include determining an appearance state for the human inhabited character based on the first and second data. For example, one or more of the computing device 110, the processor 802, or the controller 202 may determine the appearance state 220 for the animated character 160 based on the audio data 210 and/or 140 and the image data 212 and/or 142. In an example, the appearance state 220 may be based on one or more of an action state 222, a conversation state 224, or a mood state 226 of the animated character 160, as described herein.

At 708, the method 700 may include displaying, on a display, the human inhabited character based on the appearance state. For example, one or more of the computing device 110, the processor 802, the display 112 or 132, or the controller 202 may display, on the display 112 or 132, the animated character 160 based on the appearance state 220.

Figure 8:
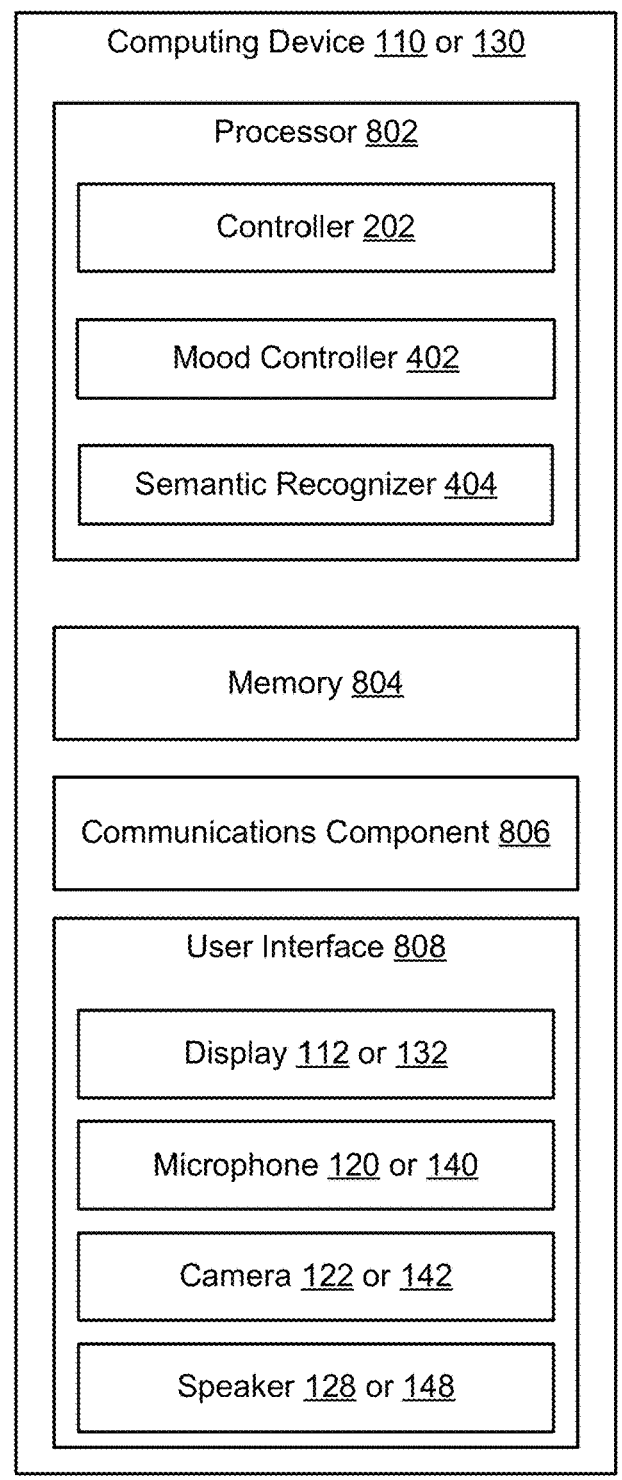
FIG. 8 is a block diagram of additional components of the computing device of FIG. 1, according to aspects of the present disclosure.

Referring to FIG. 8, illustrated is an example of other components of the computing device 110 or 130 in accordance with an implementation, including additional component details as compared to FIGS. 1, 2, and 4. In an example, the computing device 110 or 130 may include the processor 802 for carrying out processing functions associated with one or more of components and functions described herein. In an example, the processor 802 may also include a neural network to perform one or more operations described herein. The processor 802 may include a single or multiple set of processors or multi-core processors. Moreover, the processor 802 may be implemented as an integrated processing system and/or a distributed processing system. In an implementation, for example, the processor 802 may include the controller 202, the mood controller 402, and/or the semantic recognizer 404.

In an example, the computing device 110 or 130 may include memory 804 for storing instructions executable by the processor 802 for carrying out the functions described herein.

Further, the computing device 110 or 130 may include the communications component 806 that provides for establishing and maintaining communications with one or more parties utilizing hardware, software, and services as described herein. The communications component 806 may carry communications between components on the computing device 110 or 130, as well as between the computing devices 110 and 130 and/or external devices and devices located across a communications network and/or devices serially or locally connected to the computing device 110 or 130. For example, the communications component 806 may include one or more buses, and may further include transmit chain components and receive chain components associated with a transmitter and receiver, respectively, operable for interfacing with external devices.

The computing device 110 or 130 may also include a user interface component 808 operable to receive inputs from a user of the computing device 110 or 130 and further operable to generate outputs for presentation to the user. The user interface component 808 may include one or more input devices including but not limited to a keyboard, a number pad, the camera 122 or 142, a mouse, an input controller 124, a touch-sensitive display (e.g., display 112 or 132), a digitizer, a navigation key, a function key, the microphone 120 or 140, a voice recognition component, any other mechanism capable of receiving an input from a user, or any combination thereof. Further, the user interface component 808 may include one or more output devices, including but not limited to a display (e.g., display 112 or 132), the speaker 128 or 148, a haptic feedback mechanism, a printer, any other mechanism capable of presenting an output to a user, or any combination thereof.

Figure 9:
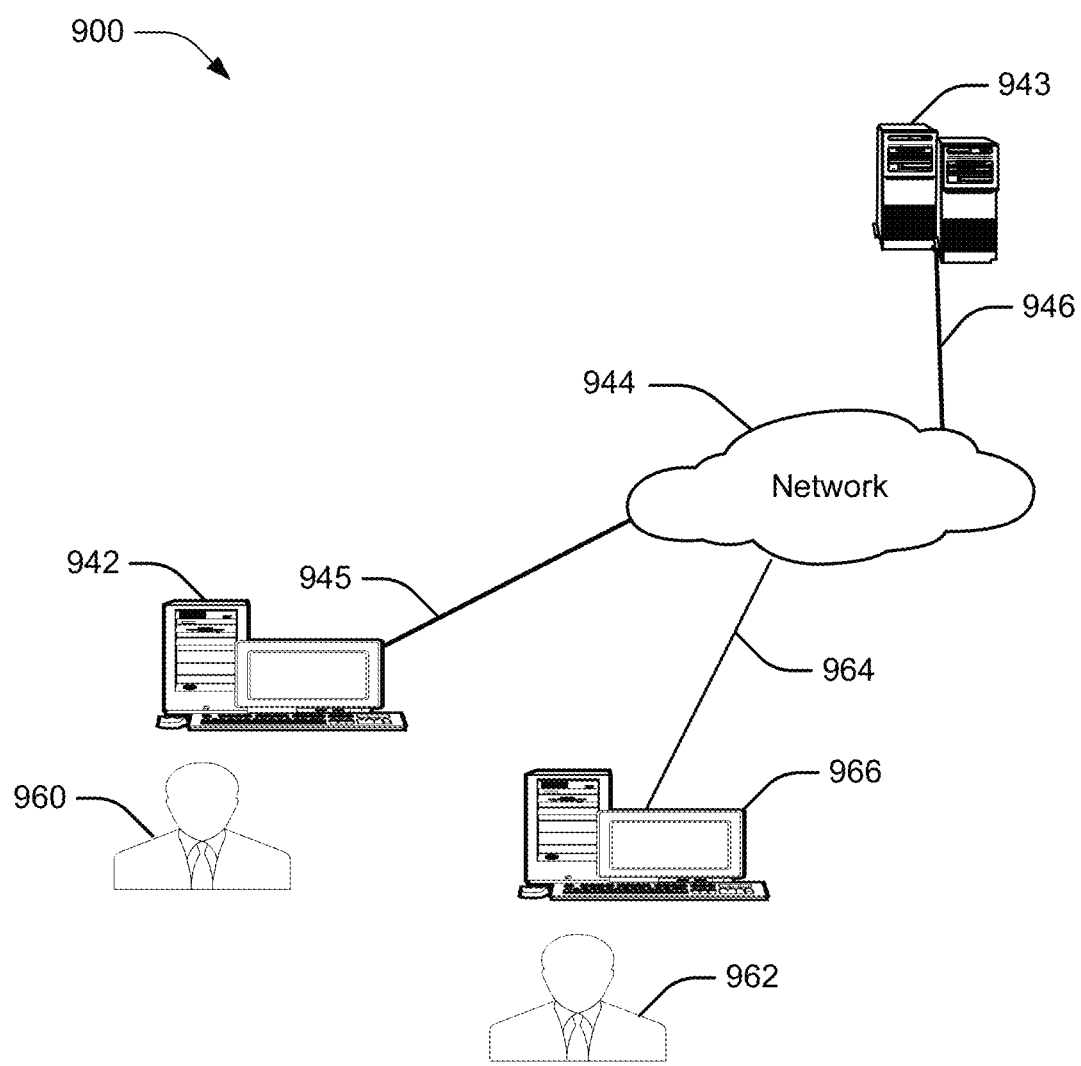
FIG. 9 is a block diagram of various exemplary system components, according to aspects of the present disclosure.

FIG. 9 is a block diagram of various example system components, in accordance with an aspect of the present disclosure. FIG. 9 illustrates a communication system 900 usable in accordance with aspects of the present disclosure. The communication system 900 includes one or more accessors 960, 962 (e.g., human specialist 150 or trainee 152) and one or more terminals 942, 966 (e.g., computing device 110 or 130). In an aspect, data for use in accordance with aspects of the present disclosure is, for example, input and/or accessed by accessors 960, 962 via terminals 942, 966, such as personal computers (PCs), minicomputers, mainframe computers, microcomputers, telephonic devices, or wireless devices, such as personal digital assistants ("PDAs") or a hand-held wireless devices coupled to a server 943, such as a PC, minicomputer, mainframe computer, microcomputer, or other device having a processor and a repository for data and/or connection to a repository for data, via, for example, a network 944 (e.g., network 106), such as the Internet or an intranet, and couplings 945, 946, 964. The couplings 945, 946, 964 include, for example, wired, wireless, or fiberoptic links. In another example variation, the method and system in accordance with aspects of the present disclosure operate in a stand-alone environment, such as on a single terminal.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and BLU-RAY DISC™ where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method for automated control of a human inhabited character by a computing device, comprising:
   receiving, from a first input device, first data corresponding to audio from one or more users;
   receiving, from a second input device, second data corresponding to one or more images of the one or more users;
   providing a plurality of mood state levels for the human inhabited character, wherein the mood state levels span a scale ranging from a negative mood to a positive mood;
   determining a mood state level from the plurality of mood state levels of the human inhabited character provided by the computing device, wherein the mood state level indicates a level of correlation between the one or more images and an appearance state for the human inhabited character, wherein the mood state level is determined in part based on one or more words or phrases detected in the first data corresponding to audio from the one or more users;
   determining the appearance state for the human inhabited character based on the first data, the second data, and the determined mood state level associated with a single mood, wherein determining the appearance state for the human inhabited character includes:
      detecting first user information in the first data corresponding to audio from the one or more users; and
      transitioning the human inhabited character from a first appearance state associated with a first behavior included in a first group of a plurality of different groups to a second appearance state associated with a second behavior included in a second group of the plurality of different groups in response to detecting the first user information, wherein the plurality of different groups are associated with a corresponding plurality of behaviors, wherein the first group of the plurality of different groups is associated with a first body posture and the second group of the plurality of different groups is associated with a second body posture, wherein a rate at which the human inhabited character transitions from the first appearance state associated with the first behavior included in the first group of the plurality of different groups to the second appearance state associated with the second behavior included in the second group of the plurality of different groups depends in part on the determined mood state level; and
   displaying, on a display, the human inhabited character based on the appearance state.

2. The method of claim 1, wherein the determining the appearance state further comprises:

transitioning the human inhabited character from the second appearance state to the first appearance state;
determining first user information is not present in the first data; and
transitioning the human inhabited character from the first appearance state to a third appearance state in response to the first user information not being present and based on a relationship of the first appearance state to the third appearance state.

3. The method of claim 1, further comprising:
receiving user input indicating an action for the human inhabited character to perform, wherein the determining the appearance state further comprises:
determining one or more behaviors associated with the action; and
transitioning the human inhabited character from a current appearance state to a next appearance state based on the one or more behaviors.

4. The method of claim 1, further comprising:
determining a mood state for the human inhabited character based on the first data and the second data, wherein the displaying the human inhabited character is further based on the mood state.

5. The method of claim 4, further comprising:
determining, by a semantic recognizer, the one or more words or phrases from the first data corresponding to audio from the one or more users to indicate a mood state setting, wherein the mood state is determined based on the mood state setting.

6. The method of claim 1, wherein providing the plurality of mood state levels comprises providing the plurality of mood state levels via a user interface and a user selection of the mood state level is received via the user interface.

7. The method of claim 1, wherein providing the plurality of mood state levels further comprises providing a continuous sliding scale showing the plurality of mood state levels.

8. The method of claim 1, wherein the determined mood state level is a positive mood.

9. The method of claim 1, wherein the determined mood state level is a negative mood.

10. A computing device for automated control of a human inhabited character, comprising:
a display;
a memory storing instructions; and
a processor coupled with the display and the memory and configured to:
receive, from a first input device, first data corresponding to audio from one or more users;
receive, from a second input device, second data corresponding to one or more images of the one or more users;
provide a plurality of mood state levels for the human inhabited character, wherein the mood state levels span a scale ranging from a negative mood to a positive mood;
determine a mood state level from the plurality of mood state levels of the human inhabited character provided by the computing device, wherein the mood state level indicates a level of correlation between the one or more images and an appearance state for the human inhabited character, wherein the mood state level is determined in part based on one or more words or phrases detected in the first data corresponding to audio from the one or more users;
determine the appearance state for the human inhabited character based on the first data, the second data, and the determined mood state level associated with a single mood, wherein determining the appearance state for the human inhabited character includes:
detecting first user information in the first data corresponding to audio from one or more users; and
transitioning the human inhabited character from a first appearance state associated with a first behavior included in a first group of a plurality of different groups to a second appearance state associated with a second behavior included in a second group of the plurality of different groups in response to detecting the first user information, wherein the plurality of different groups are associated with a corresponding plurality of behaviors, wherein the first group of the plurality of different groups is associated with a first body posture and the second group of the plurality of different groups is associated with a second body posture, wherein a rate at which the human inhabited character transitions from the first appearance state associated with the first behavior included in the first group of the plurality of different groups to the second appearance state associated with the second behavior included in the second group of the plurality of different groups depends in part on the determined mood state level; and
display, on the display, the human inhabited character based on the appearance state.

11. The computing device of claim 10, wherein the processor is further configured to:
transition the human inhabited character from the second appearance state to the first appearance state;
determine first user information is not present in the first data; and
transition the human inhabited character from the first appearance state to a third appearance state in response to the first user information not being present and based on a relationship of the first appearance state to the third appearance state.

12. The computing device of claim 10, wherein the processor is further configured to:
receive user input indicating an action for the human inhabited character to perform;
determine one or more behaviors associated with the action; and
transition the human inhabited character from a current appearance state to a next appearance state based on the one or more behaviors.

13. The computing device of claim 10, wherein the processor is further configured to:
determine a mood state for the human inhabited character based on the first data and the second data, wherein the human inhabited character is displayed further based on the mood state.

14. The computing device of claim 13, wherein the processor is further configured to:
determine, by a semantic recognizer, the one or more words or phrases from the first data corresponding to audio from the one or more users to indicate a mood state setting, wherein the mood state is determined based on the mood state setting.

15. The computing device of claim 10, wherein the determined mood state level is a positive mood.

16. The computing device of claim 10, wherein the determined mood state level is a negative mood.

17. A non-transitory computer-readable medium and comprising computer instructions for:

receiving, from a first input device, first data corresponding to audio from one or more users;

receiving, from a second input device, second data corresponding to one or more images of the one or more users;

providing a plurality of mood state levels for a human inhabited character, wherein the mood state level spans a scale ranging from a negative mood to a positive mood;

determining a mood state level from the plurality of mood state levels of the human inhabited character provided by a computing device, wherein the mood state level indicates a level of correlation between the one or more images and an appearance state for the human inhabited character, wherein the mood state level is determined in part based on one or more words or phrases detected in the first data corresponding to audio from the one or more users;

determining the appearance state for the human inhabited character based on the first data, the second data, and the determined mood state level associated with a single mood, wherein determining the appearance state for the human inhabited character includes:

detecting first user information in the first data corresponding to audio from one or more users; and the human inhabited character from a first appearance state associated with a first behavior included in a first group of a plurality of different groups to a second appearance state associated with a second behavior included in a second group of the plurality of different groups in response to detecting the first user information, wherein the plurality of different groups are associated with a corresponding plurality of behaviors, wherein the first group of the plurality of different groups is associated with a first body posture and the second group of the plurality of different groups is associated with a second body posture, wherein a rate at which the human inhabited character transitions from the first appearance state associated with the first behavior included in the first group of the plurality of different groups to the second appearance state associated with the second behavior included in the second group of the plurality of different groups depends in part on the determined mood state level; and displaying, on a display, the human inhabited character based on the appearance state.

18. The non-transitory computer-readable medium of claim 17, further comprising computer instructions for:

transitioning the human inhabited character from the second appearance state to the first appearance state;

determining first user information is not present in the first data; and transitioning the human inhabited character from the first appearance state to a third appearance state in response to the first user information not being present and based on a relationship of the first appearance state to the third appearance state.

19. The non-transitory computer-readable medium of claim 17, further comprising computer instructions for:

receiving user input indicating an action for the human inhabited character to perform;

determining one or more behaviors associated with the action; and transitioning the human inhabited character from a current appearance state to a next appearance state based on the one or more behaviors.

20. The non-transitory computer-readable medium of claim 17, further comprising computer instructions for:

determining a mood state for the human inhabited character based on the first data and the second data, wherein displaying the human inhabited character is further based on the mood state.

21. The non-transitory computer-readable medium of claim 20, further comprising computer instructions for:

determining, by a semantic recognizer, the one or more words or phrases from the first data corresponding to audio from the one or more users to indicate a mood state setting, wherein the mood state is determined based on the mood state setting.

22. The non-transitory computer-readable medium of claim 17, wherein the determined mood state level is a positive mood.

23. The non-transitory computer-readable medium of claim 17, wherein the determined mood state level is a negative mood.

* * * * *